United States Patent Office 3,641,142
Patented Feb. 8, 1972

3,641,142
PYROGENIC SYNTHESIS OF PERFLUORO-
ACRYLYL FLUORIDE
David C. England, Wilmington, Del., assignor to E. I. du
Pont de Nemours and Company, Wilmington, Del.
No Drawing. Continuation-in-part of abandoned application Ser. No. 577,143, Sept. 6, 1966. This application
Oct. 30, 1968, Ser. No. 771,995
Int. Cl. C07c 51/58
U.S. Cl. 260—544 F
4 Claims

ABSTRACT OF THE DISCLOSURE

Process for preparing perfluoroacrylyl fluoride by the pyrolysis, e.g., at 350°–800° C., of α-hydrotetrafluoropropionic acid anhydride or α-hydrotetrafluoropropionyl fluoride preferably with a two-component catalyst system, e.g., quartz and an alkali metal fluoride.

RELATED APPLICATION

This application is a continuation-in-part of my copending application Ser. No. 577,143, filed Sept. 6, 1966, now abandoned.

BACKGROUND OF THE INVENTION

(1) Field of the invention

This invention relates to, and has as its principal object provision of, a new process for preparing perfluoroacrylyl fluoride, $CF_2=CF—COF$ (I).

(2) Description of the prior art

Perfluoroacrylyl fluoride has been prepared previously by the reaction of perfluoroallyl iodide with mercurous nitrate [Tarrant and Savory, J. Org. Chem. 28, 1728–30 (1963)]. The related perfluoroacrylic acid and certain derivatives such as the nitrile, amide and ester have been prepared by various means including pyrolysis in a carbon-lined iron pipe at 500–800° C. and in the presence of a catalyst of chromia, potassium fluoride or potassium chloride [U.S. 2,862,024].

This invention provides a more practicable synthesis in which, as discussed later, the primary starting material is the industrially available perfluoropropene. In accordance with this invention, perfluoroacrylyl fluoride is prepared by catalytically pyrolyzing a compound of the structure:

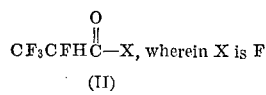

(II)

or the group

i.e., α-hydrotetrafluoropropionyl fluoride or α-hydrotetrafluoropropionic acid anhydride.

That this latter reaction would give perfluoroacrylyl fluoride was unexpected since it is known that pyrolysis of carboxylic anhydrides leads to ketenes: see Hanford and Sauer, "Preparation of Ketenes and Ketene Dimers" in Organic Reactions, vol. III, chap. 2, 108–140 (1946). Knunyants et al. report (Bull. Acad. Sci. [U.S.S.R.], Div. Chem. Sci. [English translation, 1966, pp. 1068–1071]) of the pyrolysis of $(CF_3CHFCO)_2O$ as leading to decarbonylation to form $CF_3CHFCOOCHFCF_3$ would even more lead one not to expect to obtain the perfluoroacrylyl fluoride that is formed by the process of this invention. It is also surprising that the pyrolysis of α-hydroperfluoropropionyl fluoride (II, X=F) would afford a practical route to perfluoroacrylyl fluoride since one would expect contamination with trifluoromethylfluoroketene by the reaction:

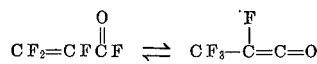

on the basis of the demonstrated behavior of the homologous perfluoromethacrylyl fluoride (D. C. England and C. G. Krespan, J. Am. Chem. Soc., 88, 5582 (1966), Knunyants et al., loc. cit.).

DESCRIPTION OF THE INVENTION

Perfluoroacrylyl fluoride is prepared according to this invention by pyrolyzing a compound of the Formula II at a temperature of at least 350° C. and in the presence of a dual catalyst system comprising (A) sodium fluoride, potassium fluoride, or cesium fluoride in anhydrous form and (B) quartz or boron phosphate in anhydrous form. An equation for the reaction, with X being F, may be written as follows:

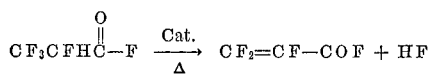

While the roles of the catalyst system components are not certain, it may be postulated that the A component, the alkali metal fluoride, catalyzes the dehydrofluorination of the [CF₃CFHCO]— groups in the reactants; the B component, quartz or boron phosphate, reacts with by-product hydrogen fluoride and does not react with the perfluoroacrylyl fluoride. Either the A or the B component can be omitted at the cost of greatly reduced yields and higher temperature, particularly when the B component is omitted. Quartz and boron phosphate are unique in having no effect on the reaction products other than hydrogen fluoride. In contrast, other forms of silica are not operable and silica gel is even detrimental in causing decomposition of the desired product, perfluoroacrylyl fluoride.

As noted, the pyrolysis reaction of this invention requires a temperature of at least 350° C. The choice of a suitable reaction temperature is largely controlled by the type of catalyst chosen. In the presence of sodium fluoride/boron phosphate, formation of perfluoroacrylyl fluoride begins at about 350° C., the preferred temperature range in this case being 375–500° C. In the presence of alkali metal fluoride/quartz, the reaction begins at about 400° C., and the preferred temperature range is 500–600° C. When the reaction is run in a quartz tube without the fluoride catalyst, perfluoroacrylyl fluoride begins to form at about 525° C., and the preferred temperature range is 550–650° C. In all cases, much higher temperatures than those mentioned above, e.g., up to 800° C., can be used if desired.

The pyrolysis operation is most conveniently conducted by introducing the starting material, either in liquid form or previously vaporized, into a zone maintained at the reaction temperature and containing the catalyst system. The reactor is appropriately a tube which may be made of any suitable material such as high-silica glass, quartz, ceramic, steel, nickel, platinum, Monel®, etc. Corrosion-resistant metals are preferred.

The pyrolysis is desirably run under reduced pressure, of the order of 1–250 mm. of mercury, to avoid unduly long contact times, but this is not essential as the operation can be conducted under atmospheric pressure, especially when using a stream of inert gas (e.g., nitrogen or argon) as the carrier and diluent. The residence time in the reaction zone is not critical but it is generally in the range of 0.5–10 seconds. The vaporized pyrolysis product emerging from the hot reaction zone is condensed in a series of cold traps and fractionally distilled to separate the desired product. Any unchanged starting material obtained in this fractionation can be recycled, and the entire operation can be made continuous for the effective life of the catalyst system by suitably designing the apparatus for this purpose.

As already indicated, two kinds of materials are used as catalyst components in the process of this invention. The A components in the catalyst system is an alkali metal fluoride, generally in pellet or granular form. These materials have the specific advantage of leading to perfluoroacrylyl fluoride uncontaminated with α-hydrotetrafluoropropionic acid fluoride, the latter being a byproduct formed when the α-hydroperfluoropropionic anhydride is pyrolyzed, and whose separation from perfluoroacrylyl fluoride requires chromatographic treatment. The use of an alkali metal fluoride catalyzes dehydrofluorination and thus avoids or minimizes this separation. The B component of the catalyst system, quartz or boron phosphate, reacts with the hydrogen fluoride by-product but does not cause decomposition of the perfluoroacrylyl fluoride. A quartz reactor tube is effective but, generally, superior results are realized if the B component is in pellet or granular form; when quartz is employed it is convenient to use beads, rods, tubing or granules as reactor packing.

The two components of the catalyst system may be mixed in the reactor but, preferably, they are in separate zones so arranged that the reaction stream contacts the A component, the alkali metal fluoride, before it reaches the B component, quartz or boron phosphate.

The degree of subdivision of the catalyst system is immaterial but a particle size between about 0.5–5 mm. is most convenient. The amount of catalyst A used, whether in static or in flow systems, is not critical. It may vary from small quantities, e.g., 0.05 mole per mole of α-hydrotetrafluoropropionic acid anhydride, to substantial molar excess, e.g., when the catalyst is used as the contact material in a flow system. The B component must be present in at least a stoichiometric amount to react with the HF evolved.

Essentially anhydrous conditions should be maintained throughout, since both the starting material and the reaction product are sensitive to water.

EMBODIMENTS OF THE INVENTION

There follow some nonlimiting examples illustrative of specific embodiments of the invention in detail.

Starting materials for use in the examples may be prepared as follows:

(A) α-Hydroperfluoropropionic acid anhydride

The α-hydrotetrafluoropropionic acid anhydride that can be used as starting material can be economically obtained from perfluoropropene. For this purpose, α-hydrotetrafluoropropionic acid is first prepared, e.g., by the three-step reaction sequence in which perfluoropropene is the starting material described in U.S. Pat. 2,862,024. The acid is then dehydrated to the anhydride by treatment with phosphorus pentoxide at moderately elevated temperature. A typical preparation of the anhydride is as follows:

A mixture of 370 g. of α-hydrotetrafluoropropionic acid and 370 g. of phosphorus pentoxide in a flask fitted with a reflux condenser and a drying tube was heated on a steam bath for about 16 hours. A vacuum was then applied and the volatile material was condensed in a trap cooled to −80° C. This product was distilled twice over a little phosphorus pentoxide to give 274 g. of α-hydrotetrafluoropropionic acid anhydride, B.P. 137–138° C. The proton nuclear magnetic resonance spectrum of the product showed that it contained about 4% by weight of unreacted α-hydrotetrafluoropropionic acid.

(B) α-Hydroperfluoropropionyl fluoride

α-Hydroperfluoropropionyl fluoride can be readily prepared from hexafluoropropene by a two-step synthesis:

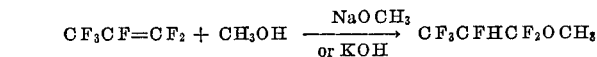

as described in U.S. 2,862,024, followed by $$CF_3CFH-CF_2OCH_3 + SO_3 \rightarrow CF_3CHFCOF + CH_3OSO_2F$$

A preparation of this precursor is as follows:

A 2-lb. ampoule of liquid sulfur trioxide (11.5 moles; Baker and Adamson "Sulfan") was poured into a 3-liter 3-neck flask fitted with a thermometer, magnetic stirrer and dropping funnel. The flask was then attached to a 30″ spinning band still having an ice-water cooled condenser. While stirring the sulfur trioxide methyl hexafluoropropyl ether (1040 g., 5.7 moles) was added dropwise. Reaction was exothermic and addition was maintained at a rate to maintain the temperature at 40–50° C. and to allow steady distillation of tetrafluoropropionyl fluoride, into an ice-cooled receiver. When addition was complete, heat was applied to the flask to complete the distillation. There was collected 760 g. of tetrafluoropropionyl fluoride. After cooling in Dry Ice, the crude product was washed three times with 50 ml. portions of concentrated sulfuric acid to remove sulfur trioxide and redistilled to give 650 g. (77%) of purified tetrafluoropropionyl fluoride boiling at 25° C. (Compare Cherburkov, Russian patent 148,042, using 100% sulfuric acid.)

EXAMPLE 1

α-Hydrotetrafluoropropionic acid anhydride (50 g.) was introduced slowly from a dropping funnel at the top of a vertically mounted, high-silica glass tube 2.5 cm. in diameter and 50 cm. long. The tube was packed in its 30-cm. center section with boron phosphate as 8–14 mesh size particles (about 1.2–2.3 mm. in diameter) and heated in this section at 400° C. by an electric furnace. The tube was connected through a liquid nitrogen-cooled trap to a vacuum pump which maintained a pressure of about 1.5 mm. within the system. On completion of the run, which took approximately 1 hour, the condenste collected in the cold trap was distilled at atmospheric pressure. There was recovered 3 g. of material boiling below 0° C. (largely trifluoroethylene), 18.4 g. of material boiling mostly at 25° C. which consisted of about equal amounts of perfluoroacrylyl fluoride and α-hydrotetrafluoropropionic acid fluoride, and 23.4 g. of higher boiling material which was mostly α-hydrotetrafluoropropionic acid with some unreacted anhydride.

Perfluoroacrylyl fluoride can be separated from the mixture containing it by gas-phase chromatography. Thus, by passing the mixture at room temperature through a column 7.3 m. long and 1.87 cm. in diameter packed with a commercial silicone oil on firebrick, using 0.8 ml. of sample per injection, α-hydrotetrafluoropropionic acid fluoride comes off in 23.7 minutes, and perfluoroacrylyl fluoride in 29.8 minutes. Pure perfluoroacrylyl fluoride has the boiling point (25.5° C.) reported by Tarrant and Savory (loc. cit.). Its infrared spectrum shows absorption bands at 5.36μ (COF) and 5.70μ (CF=CF$_2$). Its F$^{19}$ N.M.R. spectrum is in agreement with that reported by Ramey and Brey in J. Phys. Chem. 40, 2349 (1963).

EXAMPLE 2

In this example, the apparatus and procedure of Example 1 were used, with the following modifications: (a) the boron phosphate in the center portion of the reaction tube being replaced by sections of quartz tubing 6 mm. long and 9 mm. in diameter; (b) the temperature of the reaction zone was 577–600° C.

α-Hydrotetrafluoropropionic acid anhydride (100 g.) was passed through the tube at this temperature over a period of approximately 2 hours. The low boiling products (B.P. below about 35° C.) present in the condensate collected in the cold trap were separated, and the high boiling material was recycled. After four passes through the tube, there was obtained 19 g. of material boiling at about 25° C., which consisted of a mixture in approximately equal amounts of perfluoroacrylyl fluoride and α-hydrotetrafluoropropionic acid fluoride. This mixture can be separated into its components by gas phase chromatography methods.

EXAMPLE 3

The apparatus and procedure of Example 1 were used except that the boron phosphate was replaced by sodium fluoride pellets about 3 mm. in diameter, the maximum temperature was 550° C., and the internal pressure was about 10 mm. of mercury (the initial pressure was 4 mm., suggesting formation of carbon monoxide during the reaction). From 50 g. of α-hydrotetrafluoropropionic acid anhydride there was obtained in the cold trap a condensate which, on distillation, furnished 16 g. of perfluoroacrylyl fluoride, B.P. 25° C., and 4 g. of higher boiling material. The perfluoroacrylyl fluoride was further characterized by its $F^{19}$ N.M.R. spectrum. It contained no detectable amount of α-hydrotetrafluoropropionic acid fluoride.

When the same operation was conducted at a maximum temperature of about 650° C., there was obtained, from 50 g. of starting material, 10 g. of uncontaminated perfluoroacrylyl fluoride and 3 g. of higher boiling products.

EXAMPLE 4

A 34-inch x 2.5-inch Monel ® reactor having a 14-inch lower section packed with ¼-inch x ⅜-inch quartz tubing and an upper 14-inch section packed with ⅛-inch pellets of sodium fluoride was assembled by means of suitable connectors with a reactant supply vessel, product collection traps, manometer and vacuum source. A 19-inch central section of the reactor was heated with an electric furnace. The reactor contained a thermocouple well so that the temperature could be measured at any position on the axis of the reactor.

Purified α-hydroperfluoropropionyl fluoride (1254 g.) which had been cooled in Dry Ice was placed in a 2-liter, round-bottom flask stirred with a magnetic stirrer. The flask was connected to the top of the reactor by pressure tubing. Before opening the system to the α-hydroperfluoropropionyl fluoride, the hottest spot in the tube was 550° C. in the sodium fluoride bed and the pressure was 2 mm. When opened to the stirred pot of α-hydroperfluoropropionyl fluoride, the pressure was maintained at about 9 mm. by the pump. The temperature of the hot spot rose to about 580° C., and the spot moved down into the bed of quartz. Evaporation kept the liquid α-hydroperfluoropropionyl fluoride cooled, and about 3 hours was required to pass all of it through the tube. The trap containing the product was then heated in a steam bath while connected to another trap cooled in Dry Ice-acetone and vented to the hood. In this way perfluoroacrylyl fluoride and unreacted α-hydroperfluoropropionyl fluoride (800 g., ca. 94% perfluoroacrylyl fluoride and 6% α-hydroperfluoropropionyl fluoride) collected in the Dry Ice trap, most of the silicon tetrafluoride vented up the hood and an aqueous layer remained in the original trap in the steam bath. This is 69.4% conversion to the sought product, and the yield is 72.2% of the theoretical. This material was cooled, washed several times with concentrated sulfuric acid and redistilled to give 520 g. of purified material, B.P. 24° C. This amounts to 48% of the theoretical based on the starting material. Larger scale operation is readily adaptable to higher yields in the purification procedure.

EXAMPLE 5

(A) The procedure of Example 4 was followed using a reactor packed with sodium fluoride pellets and boron phosphate pellets. At a reaction temperature of 417–419° C. the "hot spot" advanced along the tube into the boron phosphate zone and 679 g. of α-hydroperfluoropropionyl fluoride yielded 461 g. of product containing 40% of perfluoroacrylyl fluoride, 31.4% conversion and 53.2% yield.

(B) The product from Part A was again passed through the reactor but the temperature was raised to 452–461° C. The product from this reaction had the following composition:

| | Percent |
|---|---|
| (1) Low-boiling impurity | 5 |
| (2) α-Hydroperfluoropropionyl fluoride | 20 |
| (3) Perfluoroacrylyl fluoride | 75 |

Perfluoroacrylyl fluoride is a useful chemical. It is highly reactive both through its acid fluoride function and its unsaturated function and thus serves as an intermediate in the preparation of many other valuable products. Furthermore, it has been found to have unexpected dyeing and surface-modifying effects on a number of textile fibers. For example, upon being held in contact with perfluoroacrylyl fluoride vapors in a sealed vessel at 100° C. for 1 hour, acrylic fibers (acrylonitrile polymers and copolymers) are dyed beige; silk fibers are dyed light yellow; and wool fibers are dyed bright yellow. These dyes are resistant and unaffected by washing with soap or detergents. Under the same conditions, nylon fibers undergo surface modifications imparting a matted structure to the fibers.

Since obvious modifications and equivalents in the invention will be evident to those skilled in the chemical arts, I propose to be bound solely by the appended claims.

The embodiments of the invention in which an exclusive property or privilege is claimed are defined as follows:

1. The process for preparing perfluoroacrylyl fluoride which comprises
   pyrolyzing
   α-hydrotetrafluoropropionyl fluoride
   at a temperature of about 400° C. to 800° C. and in the presence of a catalyst system consisting essentially of (A) an alkali metal fluoride selected from the group consisting of sodium fluoride, potassium fluoride and cesium fluoride and (B) quartz, the (B) component being present in at least a stoichiometric amount to react with the HF evolved, the process being carried out in a corrosion-resistant metal reactor.

2. The process of claim 1 wherein the catalyst system is a mixture of (A) an alkali metal fluoride and (B) quartz and the temperature is about 500–600° C.

3. The process of claim 1 wherein the catalyst system comprises separate sections of (A) sodium fluoride and (B) quartz, the material to be pyrolyzed contacting the sodium fluoride first.

4. The process of claim 1 wherein the pressure is about 1–250 mm. of mercury.

References Cited

UNITED STATES PATENTS 2,210,564  8/1940  Andrussow  260—486

FOREIGN PATENTS 793,411  4/1958  Great Britain.
381,664  10/1964  Switzerland.
148,042  8/1961  Russia.

LORRAINE A. WEINBERGER, Primary Examiner

E. J. GLEIMAN, Assistant Examiner